May 8, 1923. 1,454,227
L. O. VADNAIS
COMBINED GAUGE AND SET FOR CROSSCUT SAWS AND THE LIKE
Original Filed March 25, 1920
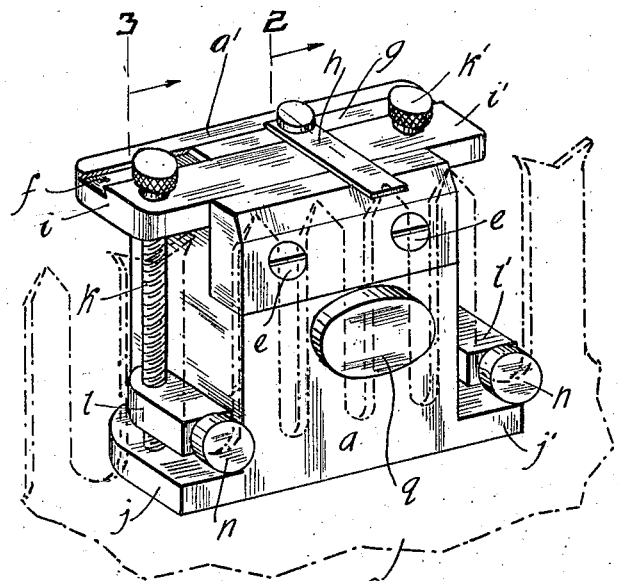
Fig 1.
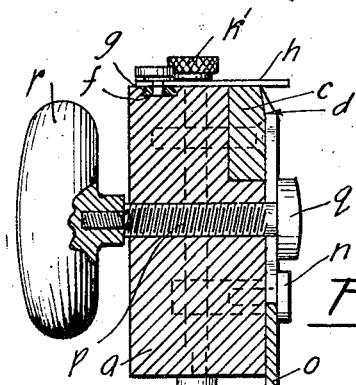
Fig. 2.
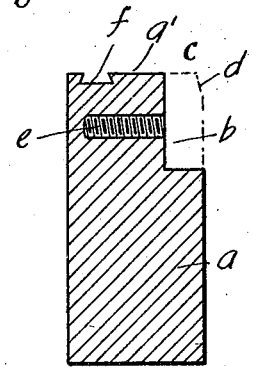
Fig. 5.
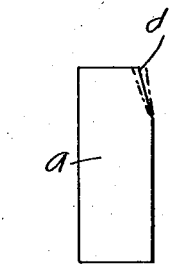
Fig. 6.
Fig. 7.
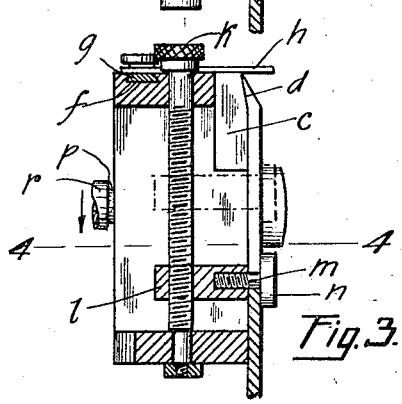
Fig. 3.
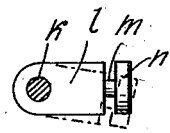
Fig. 4.
Inventor:
Louis Otto Vadnais
by Atty.

Patented May 8, 1923.

1,454,227

UNITED STATES PATENT OFFICE.

LOUIS O. VADNAIS, OF MYRTLE CREEK, OREGON.

COMBINED GAUGE AND SET FOR CROSSCUT SAWS AND THE LIKE.

Application filed March 25, 1920, Serial No. 368,729. Renewed March 5, 1923.

*To all whom it may concern:*

Be it known that I, LOUIS OTTO VADNAIS, a citizen of the United States, and a resident of Myrtle Creek, county of Douglas, State of Oregon, have invented a new and useful Improvement in Combined Gauges and Sets for Crosscut Saws and the like, of which the following is a specification.

The object of my invention is to provide a convenient instrument for accurately gaging the graduations of the teeth of a crosscut saw and the like; my device for the latter purpose including gauge pins adapted for insertion in the spaces between the saw-teeth and adjustable across the working face of the stock of my gauge, thereby to give the saw the required inclination relatively to the graduations and lead to be given the saw-teeth, and also to give the cutting lines of saw-teeth the desired curve towards the ends of the saw.

A further object of my invention is to provide the stock of my saw gauge with a removable anvil, and to provide a series of the latter so that the cut of teeth may be given the desired lateral set against the surface of the anvil.

My invention also includes the specific features hereinafter described, and illustrated in the accompanying drawings in which:—

Fig. 1 is a perspective illustrating a practical use of my combined gauge and set; a portion of a cross-cut saw blade being shown in broken outline;

Fig. 2 is a cross-section approximately taken on the broken line 2 in Fig. 1, looking in the direction indicated by the intersection arrow;

Fig. 3 is a cross-section approximately taken on the broken line 3 in Fig. 1, looking in the direction indicated by the intersecting arrow;

Fig. 4 is a plan section approximately taken on the broken line 4—4 of Fig. 3, looking in the direction indicated by the arrow;

Fig. 5 is a cross-section of the stock of my saw-gauge, showing the stock as recessed for the insertion of an anvil-piece, a section of which is shown in Fig. 6; and Fig. 7 is a diagrammatic section of the anvil drawn on a larger scale, with broken lines at the inclined face of the anvil illustrating variations in the angles of such inclined faces; that is to say, a series of anvils being provided with differently inclined faces against which to hammer, and thus give the lateral set to the cutting points of the teeth.

The stock $a$ is made with a recess $b$ in which to insert an anvil-piece $d$. As mentioned, a series of anvils are provided, each anvil having an oblique face as indicated at $d$, and the series of anvils so provided varying from each other in the angles of such oblique faces. The anvil is affixed in place by a screw $e$.

The head $a'$ of the stock is made with longitudinal, dove-tail recess $f$ in which is reciprocable a slide $g$ provided with a perpendicular arm $h$ projecting over and beyond the front or working face of the stock, so as to serve for gaging the length of the teeth as usual. The stock is made with projecting portions $i$, $j$, and $i'$, $j'$ at both ends, and therein at each end are journaled screws $k$ and $k'$. On each screw is threaded a nut, $l$ and $l'$ and from each nut projects a gauge-pin $m$ (see detail Fig. 4); the pins $m$ being preferably provided with heads $n$ at their extremities, so as to hold the saw more firmly. The gauge pins $m$ are adapted to be inserted in the spaces between adjacent teeth in the manner illustrated in Fig. 1; and by adjusting the screws $k$, $k'$, so as to place the nuts $l$, $l'$ in different planes, the saw-blade may be inclined as desired for graduating the length of the teeth; the saw-blade being shown in Fig. 1 by the broken outline $o$.

A clamp is provided for rigidly holding the saw on the working face of the stock of the gauge. The clamp is constructed as follows: Thru the stock $a$ is transversely threaded a screw-shank $p$ provided with a clamping-head $q$, at its end projecting beyond the working face of the stock; and the screw shank $p$ is provided at its other end with a handle $r$ so that the screw $p$ may be rotated for applying the clamping head $q$, as more clearly illustrated in Fig. 2, in which $o$ designates the saw blade. As obvious, the clamping of the saw to the working face of my saw gauge, serves to rigidly hold the saw in place while setting the points of the cutter teeth, and gaging the length of the teeth.

In using my device, the gauge-pins $m$ are first given the adjustment required for positioning the saw relatively to the desired graduation of the length of the saw teeth, and thus the saw is clamped to the working face of my saw gauge, so as rigidly to hold the saw in place while working thereon.

I claim:

1. In a saw-gauge, gauge-pins adapted for insertion in the spaces between the teeth of the saw to be gaged, projecting perpendicularly beyond the working face of the stock and independently adjustable across said working face, thereby to position the saw relatively to the desired graduation of the saw teeth.

2. In a saw-gauge, gauge-pins adapted for insertion in the spaces between the teeth of the saw to be gaged, projecting perpendicularly beyond the working face of the stock and independently adjustable across said working face, thereby to position the saw relatively to the desired graduation of the saw teeth, the extremities of such gauge-pins being headed.

3. In a saw gauge a screw journaled at each end of, and transversely to the stock, a nut threaded on each screw and a gauge-pin carried by each nut.

4. In a saw-gauge a clamp operable to clamp the saw-blade to the working face of the gauge stock, the ends of the stock having projecting portions, a screw journaled at each end of, and transversely to the stock in said projecting portions of the latter, a nut threaded on each screw and a gauge-pin carried by each nut.

5. A saw gauge comprising a slide mounted for longitudinal reciprocation in the head of the stock and having a perpendicular arm projecting over and beyond the working face of the stock, gauge-pins adapted for insertion in the space between the teeth of the saw to be gaged, projecting perpendicularly beyond the working face of the stock, means for independently adjusting said gauge-pins across said working face thereby to position the saw relatively to the desired graduation of the saw teeth, and means for clamping the saw blade rigidly to the working face of the stock.

LOUIS O. VADNAIS.